G. W. BINGHAM.
MOVING PICTURE MACHINE.
APPLICATION FILED SEPT. 29, 1910.
1,037,112.
Patented Aug. 27, 1912.
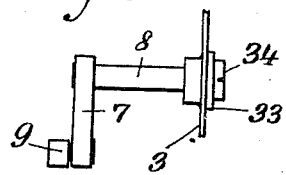
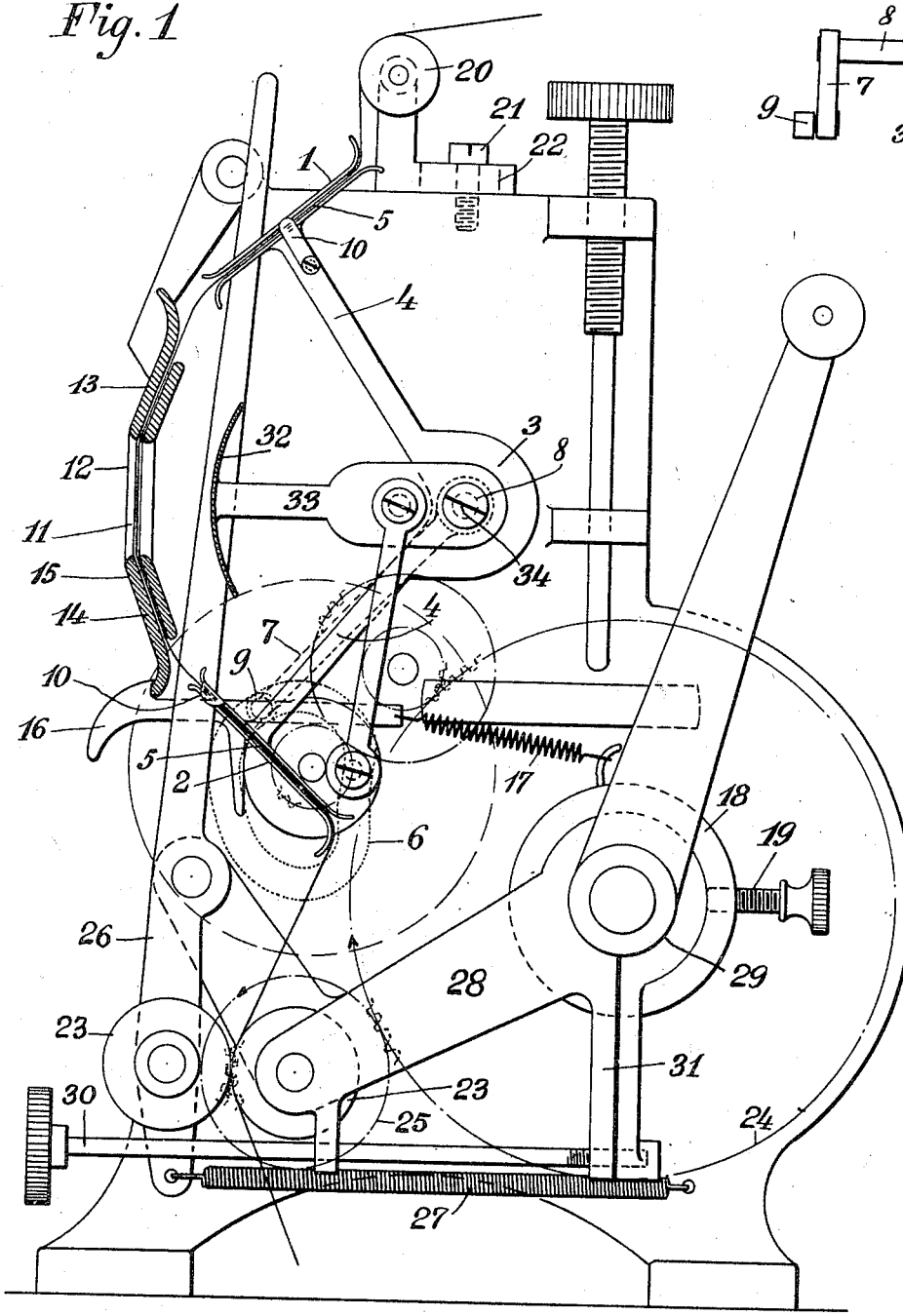
WITNESSES
Philip S. McLean.
Teresa V. Lynch.
INVENTOR
George W. Bingham
BY
Brock Beeker & Smith
ATTORNEYS

UNITED STATES PATENT OFFICE.

GEORGE W. BINGHAM, OF NEW YORK, N. Y., ASSIGNOR TO THE BINGHAM MANUFACTURING COMPANY, A CORPORATION OF MAINE.

MOVING-PICTURE MACHINE.

1,037,112.   Specification of Letters Patent.   Patented Aug. 27, 1912.

Application filed September 29, 1910. Serial No. 584,402.

*To all whom it may concern:*

Be it known that I, GEORGE W. BINGHAM, a citizen of the United States, and a resident of the borough of Brooklyn, New York city, in the county of Kings and State of New York, have invented certain new and useful Improvements in Moving-Picture Machines, of which the following is a specification.

My invention relates to improvements in moving picture machines, and particularly to the film advancing mechanism thereof.

The principal object of my invention is to simplify the means for imparting the intermittent advancing movement to the film and to reduce this mechanism to the fewest possible number of parts.

Another object of my invention is to reduce the wear on the film.

My invention accordingly consists, in its preferred form, of a pair of film guides through which the film is passed, which guides are carried by a common support and partake of an oscillatory movement. These guides are preferably arranged above and below the exposure opening of the machine, so that upon the oscillatory movements thereof, the film will be intermittently advanced past the exposure opening. Specifically, these film guides are preferably in the form of flattened tubes which may be open along one side for the ready insertion of the film therein, and in order to reduce the wear on the film as much as possible, these guides, as disposed above and below the exposure opening, may be arranged on converging lines with respect to said exposure opening. By reason of such an arrangement, there will be no abrupt bends in the film, so that friction and wear will be thereby reduced to a minimum. Associated with the upper of the film guides, there is preferably a relatively fixed guide of some sort, which for certain purposes may be made adjustable, and associated with the lower film guide there is preferably a take up device of some sort which will wind up the film as it is advanced and will hold the film against retrogressive movement.

Various other objects and features of my invention will appear as the specification proceeds.

In the accompanying drawings there is illustrated one of the preferred embodiments of the invention, but it will be understood that various changes and modifications may be made therein without departing from the spirit and scope of the invention.

In the drawings: Figure 1 is a side elevation of a preferred form of my invention in its application to a projector for showing moving pictures. Fig. 2 is a broken detail view of a portion of the film advancing mechanism.

Like reference characters indicate corresponding parts throughout the several views.

The upper and lower film guides by which the film is advanced are denoted 1 and 2 respectively, and these guides are preferably carried by a common supporting member 3, which for this purpose may have two divergent arms 4, upon the ends of which the film guides are fixed. These film guides may be in the form of rolls or like devices, but they preferably consist of the flattened tubular members, as shown, and may have one side left open, as at 5, for the ready insertion of the film therein. An oscillatory movement is imparted to the film guides by any suitable means, such as a cam 6. The connections from said cam may of course vary, but in the present instance they consist of a rocker arm 7, fixed to one end of the shaft 8, which carries the supporting member 3, the said rocker arm having a roll or like part 9, for engagement with the cam. This cam is preferably of a design like that shown in my Patent No. 963,741, so as to impart to the film guides a comparatively slow upward movement and a relatively quick downward movement. In order to prevent the film from accidentally slipping out of the side of the film guide, once it is inserted therein, the film guide may be provided with an overhanging guard or tongue 10, adapted to serve as a closure to the open side of the tubular guide. These two movable film guides are, as shown, preferably arranged above and below the exposure opening 11 of the machine, and to obviate all short bends in the film, the respective guides may be inclined on converging lines with respect to the exposure opening, substantially in the manner illustrated in the drawings.

In order further to reduce wear and friction on the film, the film support 12 in which the exposure opening is formed, may also be formed with rearwardly sloping guiding portions 13 and 14, above and below the exposure opening. The film guides and the inclined guiding portions of the film support will thus preferably be arranged substantially on the same converging lines so that the film will thus be subjected to very little wear, on account of the lack of bends therein. The door 15 which is associated with the member containing the exposure opening is preferably shaped to correspond to the inclined guiding portions of the said member, and it may be used to clamp and hold the film with respect to the exposure opening. For this reason there may be provided a hook part 16 for engagement with the clamp, to hold the clamp in closed position. In order to secure a certain yielding action with this clamp, a spring 17 is preferably interposed between the hook part and a fixed part of the machine. In order to permit of the adjustment of the tension of the clamp, this spring may have the end which is to be anchored, attached to a rotatable member 18, which member may be held fixed in any adjusted position by means of a screw 19 or like securing device.

Associated with the upper film guide there is usually a fixed guide of some sort, which may conveniently be in the form of a roll 20. The film passes over this fixed guide before entering the upper movable film guide, and this fixed guide may be made relatively adjustable with respect to the movable guide, as by means of the screw 21 and slotted connection 22.

For the purpose of winding up the film as it is advanced by the film advancing mechanism, there is preferably provided a take up device of some sort, such as the one shown in the drawings. This take up device, as here shown, consists of a pair of cooperating rolls 23 between which the film is gripped, said rolls being driven from the main drive gear 24 of the machine through the medium of a gear 25 fixed to one of the rolls. One of the rolls is made movable with respect to the other roll, so as to permit insertion of the film therebetween, and for this reason it may be carried by a pivoted lever 26, and held in yielding engagement with the other roll by means of the spring 27.

In the operation of the parts thus far described, during the upward and comparatively slow movement of the film guides, the upper film guide will act to draw down a certain amount of film over the relatively fixed guide and upon the reverse or downward movement of the film guides, the lower guide will act to pull down an amount of film past the exposure opening, substantially equal to that amount just advanced by the upper film guide. During this quick downward film-advancing stroke of the film guides, the advanced portion of the film will be held in the grip of the take up device so that there will be no slippage or retrogressive movement of the film.

For the purpose of framing the pictures on the film with respect to the exposure opening, the take up device is preferably made relatively adjustable. This may be done, as in the manner shown, by mounting the take up rolls between a pair of side members 28 (only one of which is shown) having a center of movement about the hub 29. Said take up device may be retained in adjusted position by any suitable means, such as the screw 30 acting upon the clamp 31, said clamp being a part of one of the side members.

While I have illustrated my invention in its application to a projector for exhibiting moving pictures, I would have it understood that the invention and the various features thereof may be applied equally as well to a camera for taking pictures, or for any other uses found practicable.

The pivotal center of the supporting member which carries the film guides, is preferably located in the same horizontal plane as the optical center of the machine—that is, in alinement with the horizontal axis of the exposure opening.

The shutter which I have illustrated in the present application is of the oscillatory type such as that described and claimed in my Patent No. 960,793. This shutter consists of a blade 32 carried by an arm 33, and, as it is desirable to have the shutter arm also pivoted in the same horizontal plane as the optical axis, the pivot support 34 for the shutter may be disposed in line with the pivotal center of the supporting member. The pivotal center for the shutter may thus be in the form of a stud or screw, as shown, mounted in the end of the rockshaft or pivotal center which carries the supporting member.

The same object as to the reduction of wear on the film may be attained if the film supporting member containing the exposure opening and the door associated therewith be made curved instead of being angular in shape, as shown.

What is claimed, is:

1. In a moving picture machine, film advancing means comprising film guides through which the film is passed, a common support for said guides, and means for imparting an oscillatory movement to the support and thus to the guides carried thereby.

2. In a moving picture machine provided with an exposure opening, upper and lower film guides through which the film is passed, located above and below the exposure opening respectively, a common support for said film guides, and means for oscillating the support and guides carried thereby, whereby the film will be intermittently advanced past the exposure opening.

3. In a moving picture machine provided with an exposure opening, upper and lower film guides through which the film is passed, located above and below the exposure opening respectively, a common support for said film guides, means for oscillating the support and guides carried thereby, whereby the film will be intermittently advanced past the exposure opening, and a relatively fixed guide over which the film is passed before being passed through the first relatively movable film guide.

4. In a moving picture machine, film guides through which the film is passed, a common support for said guides, means for oscillating the support and guides carried thereby, whereby the film will be intermittently advanced, and a take-up device adapted to wind up the film so advanced.

5. In a moving picture machine, film guides through which the film is passed, a common support for said guides, means for imparting an oscillatory movement to the support and guides carried thereby, a relatively fixed guide associated with one of the movable guides, and a take up device associated with the other movable guide.

6. In a moving picture machine, upper and lower film guides through which the film is passed, a common support for said guides, means for oscillating the support and film guides carried thereby, a relatively fixed guide associated with the upper movable film guide, whereby upon one movement of the guides, said upper movable guide will act to draw down an amount of film over the relatively fixed guide, and a take up device associated with the lower movable guide adapted to wind up the film and hold the advanced portion of the film so that the lower guide will upon the reverse movement of the guides advance the film an amount substantially equal to that amount drawn down over the upper fixed guide.

7. In a moving picture machine provided with an exposure opening, film guides for the reception of the film, located above and below the exposure opening, a common support for said film guides, means for oscillating the support and guides carried thereby, and means adjacent the lower film guide adapted to wind up the film and hold the same so that upon one of its movements the lower film guide will act to draw down an amount of film past the exposure opening.

8. In a moving picture machine provided with an exposure opening, upper and lower film guides, located above and below the exposure opening, a common support for said film guides, means for oscillating said support and the guides carried thereby, an upper relatively fixed guide associated with the upper movable guide, whereby upon one of the movements of the guides said upper guide will act to draw down an amount of film over said fixed guide, and holding means associated with the lower movable guide adapted to hold the film so that upon the opposite movement of the film guides the lower guide will act to draw down an amount of film past the exposure opening substantially equal to that amount drawn down by the upper film guide.

9. In a moving picture machine, upper and lower flat tubular guides for the reception of the film, a common support for said guides, and means for oscillating the support and guides carried thereby, whereby an intermittent advancing movement will be imparted to the film.

10. In a moving picture machine provided with an exposure opening, upper and lower film guides, located above and below the exposure opening, a common support for said film guides, means for oscillating the support and guides carried thereby to intermittently advance the film past the exposure opening, means for holding the film so advanced, associated with the lower film guide, and means for adjusting said holding means with respect to the said guide.

11. In a moving picture machine, upper and lower film guides adapted for the reception of the film, means for oscillating said film guides to impart an intermittent advancing movement to the film, a take up device adapted to wind up the film so advanced, and means for adjusting said take up device with respect to the lower film guide.

12. In a moving picture machine, upper and lower film guides adapted for the reception of the film, means for oscillating said guides to impart an intermittent advancing movement to the film, and a fixed though relatively adjustable guide associated with the upper movable film guide.

13. In a moving picture machine provided with an exposure opening, flat tubular guides for the film, located above and below the exposure opening, a pivotally mounted support for said guides, and means for oscillating said support upon the pivotal center thereof, whereby the guides carried by said support will be oscillated to intermittently advance the film past the exposure opening.

14. In a moving picture machine, a film supporting member having an exposure opening therein, said member having a central substantially vertical portion containing the exposure opening, guiding portions above and below and inclined away from such substantially vertical portion, and guides for the passage of the film, above and below the film supporting member, said guides being inclined to substantially accord with the inclination of the upper and lower guiding portions of the film supporting member.

15. In a moving picture machine, a film supporting member having an exposure opening therein, said member having a central substantially vertical portion containing the exposure opening, guiding portions above and below and inclined away from such substantially vertical portion, guides for the passage of the film, above and below the film supporting member, said guides being inclined to substantially accord with the inclination of the upper and lower guiding portions of the film supporting member, a common support for the film guides, and means for oscillating the said support and the film guides carried thereby, so as to intermittently advance the film past the exposure opening.

16. In a moving picture machine, upper and lower film guides adapted for the passage of the film therethrough, said film guides being arranged on converging lines, and means for oscillating said guides to intermittently advance the film.

17. In a moving picture machine, upper and lower film guides adapted for the passage of the film therethrough, said film guides being arranged on converging lines, a common support for said film guides, and means for rocking said support to impart an oscillating movement to the film guides so as to intermittently advance the film past the exposure opening.

18. In a moving picture machine, a pivotally mounted member having divergent arms radiating from the pivotal support of the member, tubular film guides carried by said divergent arms for the passage of the film therethrough, and means for oscillating said member to impart an intermittent advancing movement to the film.

19. In a moving picture machine provided with an exposure opening, a pivotally mounted member having divergent arms extending above and below the exposure opening, flat tubular film guides carried by the said divergent arms and adapted for passage of the film therethrough, and means for oscillating said member, whereby the film guides will act to intermittently advance the film past the exposure opening.

20. In a moving picture machine, a pivotally mounted member having divergent arms, flat tubular film guides carried by said arms adapted for the passage of the film therethrough, and means for rocking the pivoted member to oscillate the film guides carried thereby.

21. In a moving picture machine provided with an exposure opening, flat tubular film guides through which the film passes, located above and below the exposure opening, a common support for said film guides, and means for oscillating said support and the film guides carried thereby with a comparatively slow upward movement and a relatively quick downward movement.

22. In a moving picture machine, film advancing means comprising a support, film guides carried by said support and spaced apart from each other, an arm connected with said support, a cam member, and a part carried by said arm adapted for engagement with the said cam member.

23. In a moving picture machine, a supporting member, relatively spaced film guides carried by said supporting member, a rockshaft on which said supporting member is engaged, an arm fixed to said rockshaft, a cam, and a part carried by the arm aforesaid in engagement with the said cam.

24. In a moving picture machine, a take-up device comprising take-up rolls, a frame in which said rolls are journaled, a support on which said frame is rotatably engaged, and a clamping device for securing the frame in adjusted position upon the support.

25. The combination in a moving picture machine, provided with an exposure opening, of film advancing means comprising upper and lower film guides arranged above and below the exposure opening, and means for oscillating both of said film guides from a common center.

26. The combination in a moving picture machine, provided with an exposure opening, of film advancing means comprising upper and lower film guides arranged above and below the exposure opening, means for oscillating both of said film guides from a common center, and a take-up device associated with the lower film guide adapted to wind up the film so advanced.

27. The combination in a moving picture machine, of a film support provided with an exposure opening therein, said film support having rearwardly sloping guiding portions disposed above and below the exposure opening, a clamping door associated with said film support, said clamping door being shaped to correspond to the shape of the film support, guides for the passage of the film, above and below the film supporting member, said guides being inclined to substantially accord with the inclination of the upper and lower guiding portions of the film supporting member, and means for oscillating said guides.

28. The combination in a moving picture machine, provided with an exposure opening, of film advancing means comprising, a supporting member, film guides carried by said supporting member, arranged above and below the exposure opening, a pivotal center for said supporting member arranged in substantial alinement with the optical axis of the exposure opening, and means for oscillating the supporting member and film guides carried thereby about the said pivotal center.

29. The combination in a moving picture machine, provided with an exposure opening, of film advancing means comprising, a supporting member, film guides carried by said supporting member, arranged above and below the exposure opening, a pivotal center for said supporting member arranged in substantial alinement with the optical axis of the exposure opening, means for oscillating the supporting member and film guides carried thereby about the said pivotal center, and an oscillating shutter associated with the exposure opening, the said shutter also having a pivotal center disposed in the same horizontal plane of the optical axis of the exposure opening.

30. The combination in a moving picture machine, provided with an exposure opening, of a supporting member and film guides carried thereby, a rockshaft on which said supporting member is mounted, means for oscillating the supporting member and film guides carried thereby, a shutter arm pivotally engaged upon the end of the rockshaft aforesaid, and a shutter blade carried by said shutter arm and associated with the exposure opening.

31. The combination in a moving picture machine, provided with an exposure opening, of a supporting member and film guides carried thereby, a rockshaft on which said supporting member is mounted, disposed in substantial alinement with the optical axis of the exposure opening, means for oscillating the supporting member and film guides carried thereby, a shutter arm pivotally engaged upon the end of the rockshaft aforesaid, and a shutter blade carried by said shutter arm and associated with the exposure opening.

32. In a machine of the character set forth, a main drive gear, a take-up device comprising, a frame adjustable about the axis of said main drive gear, a take-up roll journaled in said frame, a pinion fixed to said roll, in mesh with the main drive gear, a lever fulcrumed on said frame, a second take-up roll carried by said lever, adapted for engagement with the first take-up roll, gearing connections between the two take-up rolls, means for holding the relatively movable roll in yielding engagement with the said roll, and means for securing the frame in adjusted position about the main drive gear.

33. In a moving picture machine, provided with an exposure opening, film advancing means comprising, upper and lower tubular film guides, arranged above and below the exposure opening, said guides each having an open side to permit ready insertion of the film therein, and means for oscillating said film guides about a common center.

34. In a moving picture machine, flat tubular film guides having open sides to permit insertion of the film therein, guards adapted to partially close the open sides of the film guides, and means for oscillating the film guides about a common center.

35. In a moving picture machine provided with an exposure opening, film advancing means comprising flat tubular film guides arranged on opposite sides of the exposure opening, said guides each having an open side to permit the film to be inserted sidewise therein, means for oscillating the film guides to intermittently advance the film past the exposure opening, and holding means at the open sides of the film guides to prevent disengagement of the film therefrom.

36. In a moving picture machine provided with an exposure opening, flat tubular film guides having open sides to permit the film being inserted sidewise therein, means covering the open sides of the film guides to secure the film within the guides, the said guides being arranged on convergent angles and disposed on opposite sides of the exposure opening, and means for oscillating the film guides whereby the film will be intermittently advanced past the exposure opening.

Signed at New York city in the county of New York and State of New York this 23rd day of September A. D. 1910.

GEORGE W. BINGHAM.

Witnesses:
 PHILIP S. McLEAN,
 AXEL V. BEEKEN.